United States Patent
Katayama

(10) Patent No.: US 10,502,659 B2
(45) Date of Patent: Dec. 10, 2019

(54) MISFIRE DETECTION DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Akihiro Katayama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 134 days.

(21) Appl. No.: 15/921,959

(22) Filed: Mar. 15, 2018

(65) Prior Publication Data

US 2018/0275017 A1 Sep. 27, 2018

(30) Foreign Application Priority Data

Mar. 23, 2017 (JP) .................. 2017-057930

(51) Int. Cl.
| | |
|---|---|
| G01M 15/11 | (2006.01) |
| F02D 41/28 | (2006.01) |
| F02D 41/22 | (2006.01) |
| F02D 41/00 | (2006.01) |
| F02D 41/14 | (2006.01) |

(52) U.S. Cl.
CPC ......... *G01M 15/11* (2013.01); *F02D 41/0097* (2013.01); *F02D 41/22* (2013.01); *F02D 41/28* (2013.01); *F02D 2041/1432* (2013.01); *F02D 2041/1433* (2013.01); *F02D 2041/288* (2013.01); *F02D 2200/1015* (2013.01)

(58) Field of Classification Search
CPC .................................................. G01M 15/11
USPC ................ 73/114.02, 114.03, 114.04, 114.05
See application file for complete search history.

(56) References Cited

U.S. PATENT DOCUMENTS

| | | | | |
|---|---|---|---|---|
| 5,747,679 A | * | 5/1998 | Dietz | .................... G01M 15/11 123/436 |
| 6,357,287 B1 | * | 3/2002 | Jin | ...................... F02D 41/1498 73/114.05 |
| 7,707,874 B2 | * | 5/2010 | Suzuki | .................. G01M 15/11 73/114.04 |

(Continued)

FOREIGN PATENT DOCUMENTS

| | | |
|---|---|---|
| JP | 2008-248877 A | 10/2008 |
| JP | 2012-251473 A | 12/2012 |

(Continued)

*Primary Examiner* — Eric S. McCall
(74) *Attorney, Agent, or Firm* — Oliff PLC

(57) ABSTRACT

An electronic control unit of a misfire detection device is configured to calculate first time series data based on a detected angle signal of a rotating shaft and a crank signal of a crankshaft in a connected state, a state where the rotating shaft and the crankshaft are connected. The electronic control unit is configured to generate, in the connected state, second time series data acquired by removing a predetermined frequency component from time series data indicating a rotational behavior of the crankshaft. The electronic control unit is configured to generate third time series data indicating the rotational behavior of the crankshaft by combining the second time series data with the predetermined frequency component based on the first time series data and the second time series data. The electronic control unit is configured to determine presence of misfire in an internal combustion engine based on the third time series data.

5 Claims, 8 Drawing Sheets

(56) References Cited

U.S. PATENT DOCUMENTS

| | | | | |
|---|---|---|---|---|
| 10,139,314 B2* | 11/2018 | Hiroi | .................. | F02D 41/0097 |
| 2004/0122585 A1* | 6/2004 | Aono | ..................... | G01M 15/11 |
| | | | | 701/111 |
| 2009/0308145 A1 | 12/2009 | Suzuki | | |
| 2010/0294027 A1* | 11/2010 | Kondo | ................ | F02D 41/1498 |
| | | | | 73/114.02 |
| 2011/0072893 A1* | 3/2011 | Malaczynski | ....... | F02D 41/1498 |
| | | | | 73/114.03 |
| 2018/0246011 A1* | 8/2018 | Katayama | ............... | G01M 15/11 |
| 2019/0217852 A1* | 7/2019 | Komoda | ................ | B60L 15/20 |

FOREIGN PATENT DOCUMENTS

| | | |
|---|---|---|
| JP | 2013-007363 A | 1/2013 |
| JP | 2013-234583 A | 11/2013 |

\* cited by examiner $$\omega 120 = \frac{K}{T120}$$

$\Delta NEO(n-1) = \omega 120(n-1) - \omega 120(n-2)$
$\Delta NEO(n) = \omega 120(n) - \omega 120(n-1)$ $\Delta NEO(n-1) = T120(n-1) - T120(n-2)$
$\Delta NEO(n) = T120(n) - T120(n-1)$

MISFIRE DETECTION DEVICE FOR INTERNAL COMBUSTION ENGINE

INCORPORATION BY REFERENCE

The disclosure of Japanese Patent Application No. 2017-057930 filed on Mar. 23, 2017 including the specification, drawings and abstract is incorporated herein by reference in its entirety.

BACKGROUND

1. Technical Field

The present disclosure relates to a misfire detection device for an internal combustion engine. The misfire detection device is applied to an internal combustion engine in which a transmission device is connected to a crankshaft.

2. Description of Related Art

In the disclosure of, for example, Japanese Unexamined Patent Application Publication No. 2008-248877 (JP 2008-248877 A), a power distribution and integration mechanism (transmission device) that can change the ratio of the rotation speed of a drive wheel to the rotation speed of a crankshaft is connected to the crankshaft of an internal combustion engine through a damper. A device disclosed in JP 2008-248877 A executes a process of calculating a resonance component of the rotation speed of the crankshaft caused by torsion of the damper based on the difference between the rotation speed on the transmission device side from the damper and the rotation speed of the crankshaft, and removing the resonance component from the rotation speed of the crankshaft. From the rotation speed from which the resonance component is removed, the device calculates a determination value J30 (rotation change value) that is quantified as a difference in rotational behavior in a rotation angle interval showing the influence of combustion in each of a pair of cylinders successive in time series order of compression top dead center, and determines the presence of misfire based on the rotation change value. The resonance component is removed because misfires cannot be accurately specified using the rotation speed including the resonance component.

SUMMARY

Such a device uses not only the rotation speed of a crankshaft but also a detected angle signal of a rotating shaft on the transmission device side from a damper, in order to calculate a rotation change value from which the influence of a resonance component is removed. Thus, the accuracy of calculation of the rotation change value is affected by not only errors in the rotation angle of the crankshaft but also errors in the detected angle signal. Accordingly, when errors occur in the detected angle signal, the errors in the detected angle signal affect the accuracy of misfire detection.

The present disclosure provides a misfire detection device for an internal combustion engine in order to suppress the influence of errors in a detected angle signal exerted on the accuracy of misfire detection.

Hereinafter, an aspect of the present disclosure and operation effects thereof will be described. A first aspect of the present disclosure relates to a misfire detection device for an internal combustion engine including a plurality of cylinders and a crankshaft configured to be connected to a rotating shaft of a transmission device. The misfire detection device includes a rotation angle sensor configured to output a detected angle signal of the rotating shaft by detecting a rotation angle of the rotating shaft of the transmission device, a crank angle sensor configured to output a crank signal by detecting a crank angle of the crankshaft of the internal combustion engine, and an electronic control unit. The electronic control unit is configured to calculate first time series data based on the detected angle signal of the rotating shaft and the crank signal of the crankshaft in a connected state that is a state where the rotating shaft and the crankshaft are connected to each other. The first time series data is time series data of a predetermined frequency component in time series data acquired by removing a component caused by torsion between the crankshaft and the rotating shaft from a rotational behavior of the crankshaft shown on the crank signal. The electronic control unit is configured to generate, in the connected state, second time series data that is acquired by removing the predetermined frequency component from time series data indicating the rotational behavior of the crankshaft. The electronic control unit is configured to generate third time series data that indicates the rotational behavior of the crankshaft and is acquired by combining the second time series data with the predetermined frequency component based on the first time series data and the second time series data. The electronic control unit is configured to determine presence of misfire in the internal combustion engine based on the third time series data.

In the aspect of the present disclosure, in the third time series data, frequency components other than the predetermined frequency component are calculated without using the detected angle signal. Thus, the influence of errors in the detected angle signal exerted on the third time series data is smaller than when the frequency components other than the predetermined frequency component are calculated using the detected angle signal. The influence of errors in the detected angle signal exerted on the accuracy of misfire detection can be suppressed by determining the presence of misfire using the third time series data.

In the misfire detection device according to a second aspect of the present disclosure, the predetermined frequency component may be a component in a resonant frequency band of a drive system that includes the internal combustion engine and the transmission device. The electronic control unit may be configured to determine whether or not an integer multiple frequency of one combustion cycle falls in the resonant frequency band based on a rotation speed of the crankshaft. The electronic control unit may be configured to generate the third time series data when the integer multiple frequency of one combustion cycle falls in the resonant frequency band.

Torsion between the crankshaft and the rotating shaft noticeably affects the rotational behavior of the crankshaft in the resonant frequency band. When repeated misfires occur in at least one cylinder, a noticeable influence of misfire is exhibited in the integer multiple frequency component of one combustion cycle in the time series data indicating the rotational behavior. Thus, when the integer multiple frequency component of one combustion cycle falls in the resonant frequency band, resonance noticeably affects the rotational behavior of the crankshaft, and the accuracy of misfire detection may be decreased. Therefore, in the aspect of the present disclosure, when the integer multiple frequency component of one combustion cycle falls in the resonant frequency band, the third time series data is generated by executing a frequency determination process.

In the misfire detection device according to a third aspect of the present disclosure, the electronic control unit may be configured to calculate, in the connected state, an amplitude of the predetermined frequency component of the time series data indicating the rotational behavior of the crankshaft based on an amplitude of a frequency component other than the predetermined frequency component in the time series data indicating the rotational behavior of the crankshaft. The electronic control unit may be configured to generate fourth time series data based on the amplitude of the predetermined frequency component and a phase of the predetermined frequency component corresponding to the first time series data. The electronic control unit may be configured to generate the third time series data by combining the fourth time series data with the second time series data.

In the aspect of the present disclosure, when the predetermined frequency component of the time series data indicating the rotational behavior is generated by performing a waveform shaping process, the phase of the predetermined frequency component corresponding to the first time series data is used, but the amplitude of the first time series data is not used. In the aspect of the present disclosure, the amplitude of the predetermined frequency component is calculated based on the amplitudes of the frequency components other than the predetermined frequency component in view of a correlative relationship between the amplitudes of the frequency components other than the predetermined frequency component and the amplitude of the predetermined frequency component. Accordingly, the influence of errors in the detected angle signal exerted on the accuracy of misfire detection can be suppressed.

In the misfire detection device according to a fourth aspect of the present disclosure, the third time series data may be time series data of a difference in rotation speed in a rotation angle interval that shows an influence of combustion in each of a pair of cylinders successive in time series order of compression top dead center, or time series data of a difference in rotation time period in the rotation angle interval. The electronic control unit may be configured to calculate, as the first time series data, the predetermined frequency component in time series data that is acquired by removing the component caused by torsion from the rotation speed or torque of the crankshaft. The electronic control unit may be configured to adjust a phase of the first time series data. The electronic control unit may be configured to generate the predetermined frequency component of the second time series data based on the phase of the predetermined frequency component of the first time series data of which the phase is adjusted.

The process of calculating the difference or the like in rotation speed in the rotation angle interval that shows the influence of combustion in each of the cylinders successive in time series order of compression top dead center is one type of filtering process. A predetermined component calculation process is a filtering process different from the filtering process. Thus, a difference in phase may occur between the processes. Therefore, in the aspect of the present disclosure, the phase of the predetermined frequency component in the time series data of the rotational behavior is calculated based on the first time series data by executing a phase adjustment process.

In the misfire detection device according to the aspect of the present disclosure, the predetermined frequency component may be one of three frequency components of a first order frequency component, a second order frequency component, and a third order frequency component of a combustion cycle. The electronic control unit may be configured to calculate the amplitude of the predetermined frequency component based on amplitudes of a remaining frequency components of the three frequency components.

The amplitude of the first order cycle frequency component, the amplitude of the second order cycle frequency component, and the amplitude of the third order cycle frequency component tend to have a correlative relationship. Thus, in the aspect of the present disclosure, the amplitude of the predetermined frequency component is calculated based on the correlative relationship.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
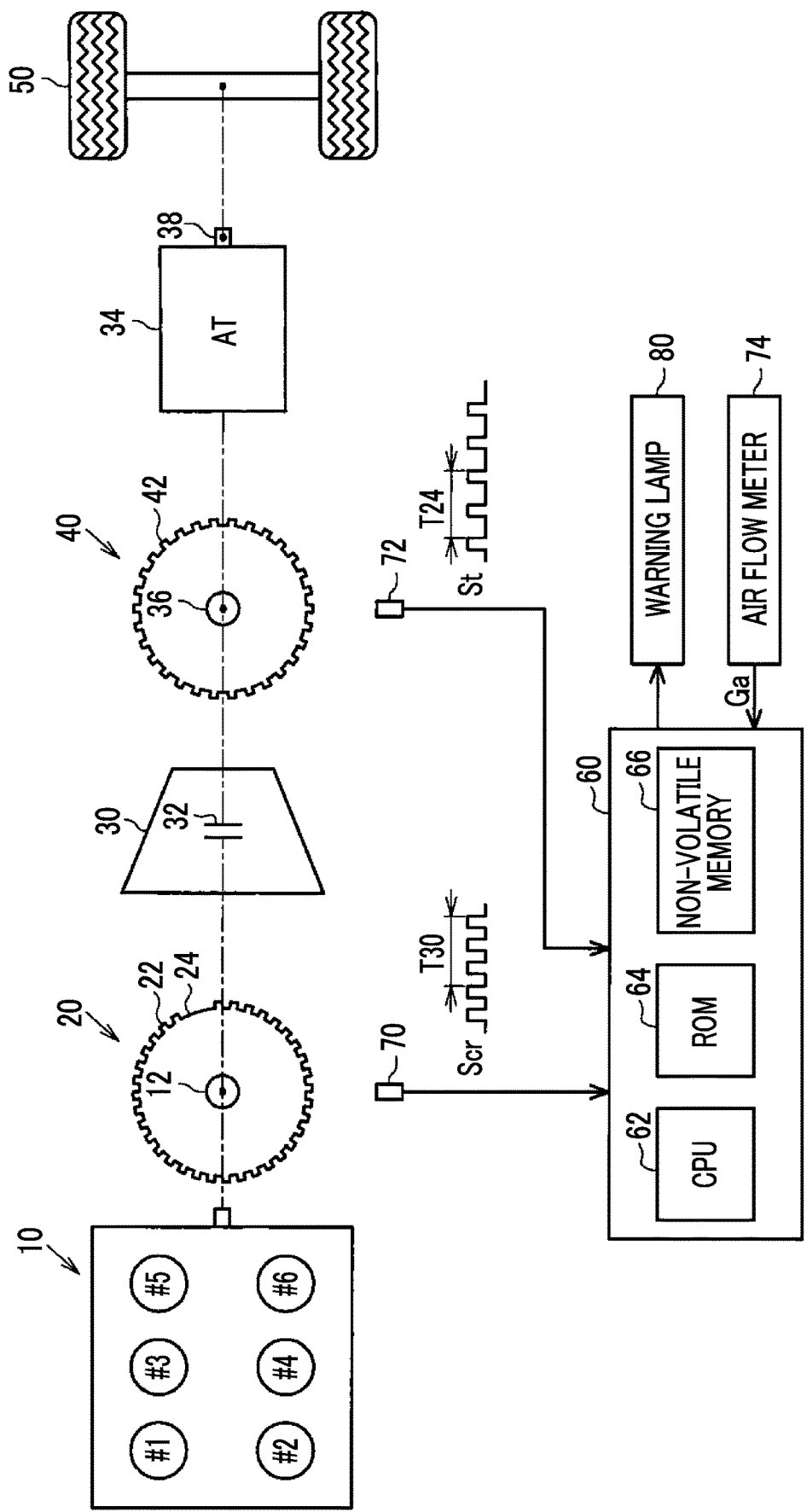
FIG. 1 is a diagram illustrating one embodiment of a misfire detection device and a relevant drive system.

Hereinafter, one embodiment of a misfire detection device will be described with reference to the drawings. As illustrated in FIG. 1, an internal combustion engine 10 is a four-stroke engine having six cylinders. Particularly, the present embodiment is based on an internal combustion engine in which torque is adjusted with the amount of air filling each cylinder, like a gasoline engine. In the following description, cylinders #1, #2, #3, #4, #5, #6 are defined in accordance with the order of compression top dead center. That is, the cylinder that has the compression top dead center after the first cylinder #1 is the second cylinder #2.

An input shaft 36 of a transmission device 34 can be connected to a crankshaft 12 of the internal combustion engine 10 through a torque converter 30. The torque converter 30 includes a lockup clutch 32. When the lockup clutch 32 is set to a fastened state, the crankshaft 12 and the input shaft 36 are connected to each other. A drive wheel 50 is mechanically connected to an output shaft 38 of the transmission device 34.

The crankshaft 12 is joined with a crank rotor 20 in which a tooth portion 22 indicating each of a plurality of rotation angles of the crankshaft 12 is disposed. While the tooth portion 22 is disposed basically at 10° CA intervals in the crank rotor 20, one non-tooth portion 24 is disposed in a location where the interval between the adjacent tooth portions 22 is 30° CA. The non-tooth portion 24 indicates the reference rotation angle of the crankshaft 12.

The input shaft 36 is joined with an NT rotor 40 in which a tooth portion 42 indicating each of a plurality of rotation angles of the input shaft 36 is disposed. The tooth portion 42 is disposed at 12° intervals in the NT rotor 40.

A control device 60 operates various actuators such as a fuel injection valve in order to control a controlled variable (torque or exhaust components) of the internal combustion engine 10. When the control device 60 controls the controlled variable or executes various diagnosis processes, the control device 60 references a crank signal Scr of a crank angle sensor 70 that detects the rotation angle of the crankshaft 12 by detecting each tooth portion 22 of the crank rotor 20, an NT signal St of an input shaft angle sensor 72 that detects the rotation angle of the input shaft 36, and an intake air amount Ga that is detected by an air flow meter 74. The control device 60 includes a CPU 62, a ROM 64, and an electrically rewritable non-volatile memory 66. The control device 60 controls the controlled variable or executes diagnosis processes by the CPU 62 executing a program stored in the ROM 64.

Figure 2:
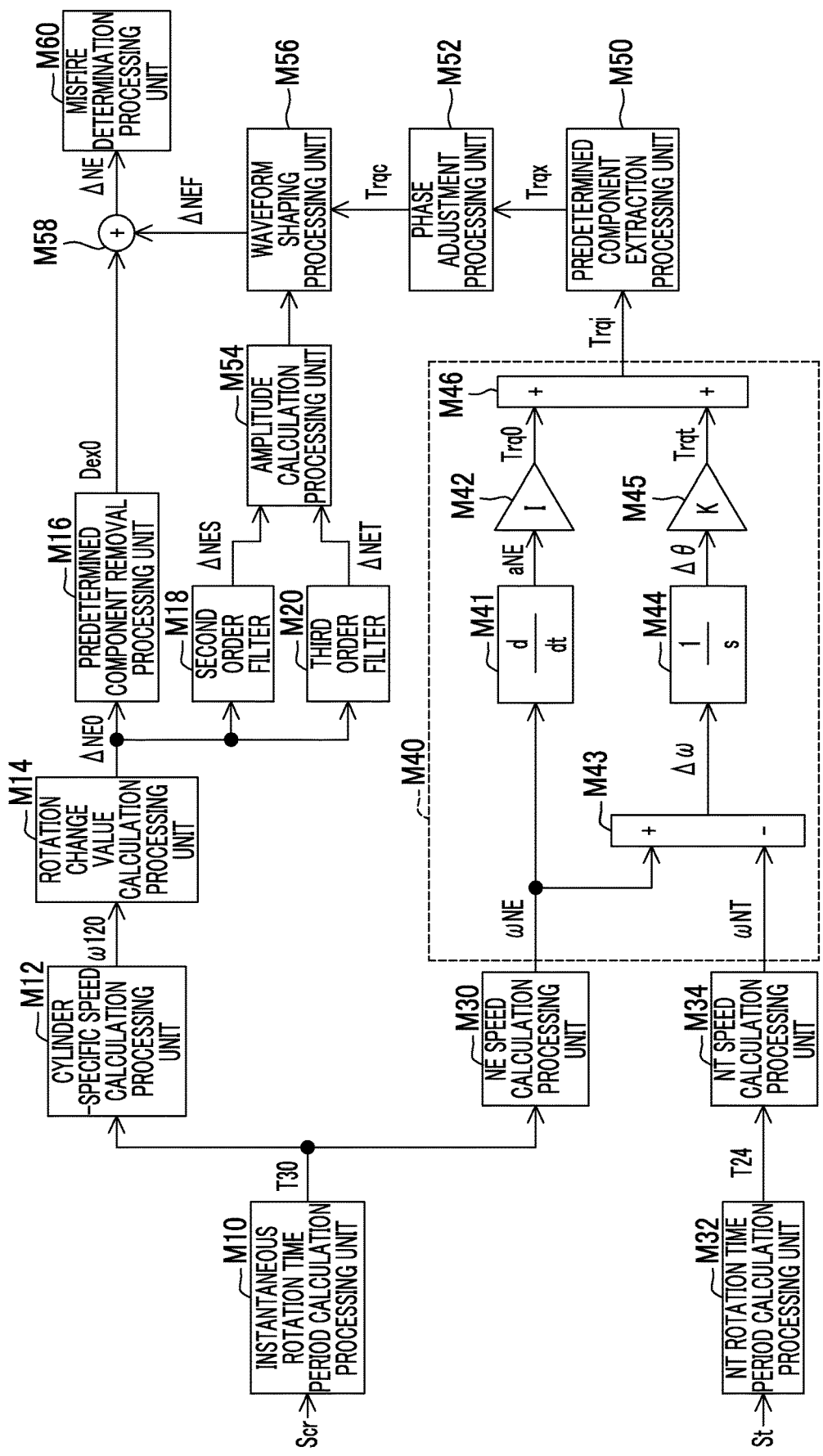
FIG. 2 is a block diagram illustrating a process related to misfire detection at the time of resonance according to the embodiment.

FIG. 2 particularly illustrates a misfire detection process of the diagnosis processes executed by the control device 60. The process illustrated in FIG. 2 is realized by the CPU 62 executing the program stored in the ROM 64. The process illustrated in FIG. 2 is executed in a rotation speed region where a first order cycle frequency component falls in the resonant frequency band of a drive system including the internal combustion engine 10 and the transmission device 34. The present embodiment assumes that in a possible region of the rotation speed of the crankshaft 12, the first order cycle frequency component falls in the resonant frequency band while a second order cycle frequency component and a third order cycle frequency component do not fall in the resonant frequency band.

An instantaneous rotation time period calculation processing unit M10 calculates instantaneous rotation time periods T30 illustrated in FIG. 1 in order based on the crank signal Scr. Each instantaneous rotation time period T30 is a time period needed for rotation corresponding to an interval of 30° CA. A cylinder-specific speed calculation processing unit M12 calculates, based on each instantaneous rotation time period T30, a cylinder-specific rotation speed w120 that is the rotation speed in a rotation angle interval showing the influence of combustion in each of the cylinders #1 to #6.

Figure 3:
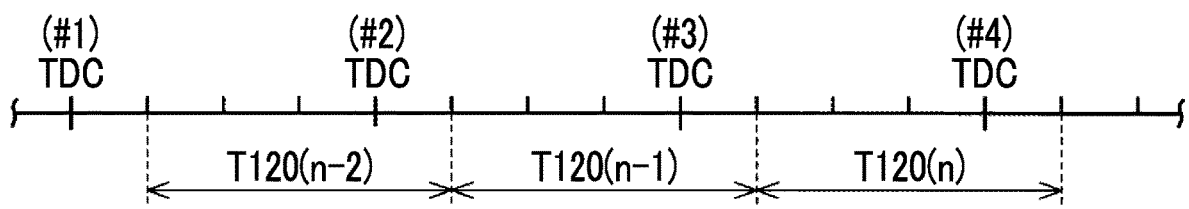
FIG. 3 is a diagram illustrating a process of calculating a cylinder-specific rotation speed in the upper side and a process of calculating a rotation change value in the middle and the lower side.
Figure 3:

FIG. 3 illustrates a process of calculating the cylinder-specific rotation speed w120 according to the present embodiment in the upper side. As illustrated in the upper side of FIG. 3, in the present embodiment, a cylinder-specific rotation time period T120 is a time period needed for rotation corresponding to an angular interval of 30 ATDC to 150 ATDC in each cylinder, and the cylinder-specific rotation speed ω 120 is set as "K/T120". The coefficient K is a quantity corresponding to the angular interval and has an angular dimension. In FIG. 3, time series data of the cylinder-specific rotation time period T120 is represented using a variable n. That is, the cylinder-specific rotation time period T120(n) corresponding to the third cylinder #3 is adjacent in time series order to the cylinder-specific rotation time period T120(n−1) corresponding to the second cylinder #2, and is generated after the cylinder-specific rotation time period T120(n−1) corresponding to the second cylinder #2.

Returning to FIG. 2, a rotation change value calculation processing unit M14 calculates a rotation change value ΔNE0 based on the cylinder-specific rotation speed ω 120. FIG. 3 illustrates a process of calculating the rotation change value ΔNE0 according to the present embodiment in the middle. As illustrated in the middle of FIG. 3, one rotation change value ΔNE0 is calculated at a time corresponding to the compression top dead center of each of the cylinders #1 to #6. For example, the rotation change value ΔNE(n−1) corresponding to the second cylinder #2 is a value acquired by subtracting the cylinder-specific rotation speed ω 120(n−2) in a rotation angle interval of 30 ATDC to 150 ATDC of the first cylinder #1 from the cylinder-specific rotation speed ω 120(n−1) in a rotation angle interval of 30 ATDC to 150 ATDC of the second cylinder #2.

Returning to FIG. 2, a predetermined component removal processing unit M16 executes a process of calculating a post-removal component Dex0 by removing a predetermined frequency component from time series data of the rotation change value ΔNE0. In the present embodiment, the predetermined frequency is set as a frequency in the resonant frequency band of the drive system including the internal combustion engine 10 and the transmission device 34. More specifically, the predetermined frequency is set as the value of the frequency at the center of the resonant frequency band. Specifically, the predetermined component removal processing unit M16 performs a bandpass filtering process and, for example, is configured with an FIR filter.

A second order filter M18 calculates a second order component ΔNES from the time series data of the rotation change value ΔNE0. The second order component is the second order component that is acquired when the predetermined frequency component is the first order component. Specifically, the second order filter M18 performs a bandpass filtering process and, for example, is configured with an FIR filter.

A third order filter M20 calculates a third order component ΔNET from the time series data of the rotation change value ΔNE0. The third order component is the third order component that is acquired when the predetermined frequency component is the first order component. Specifically, the third order filter M20 performs a bandpass filtering process and, for example, is configured with an FIR filter.

Figure 4:
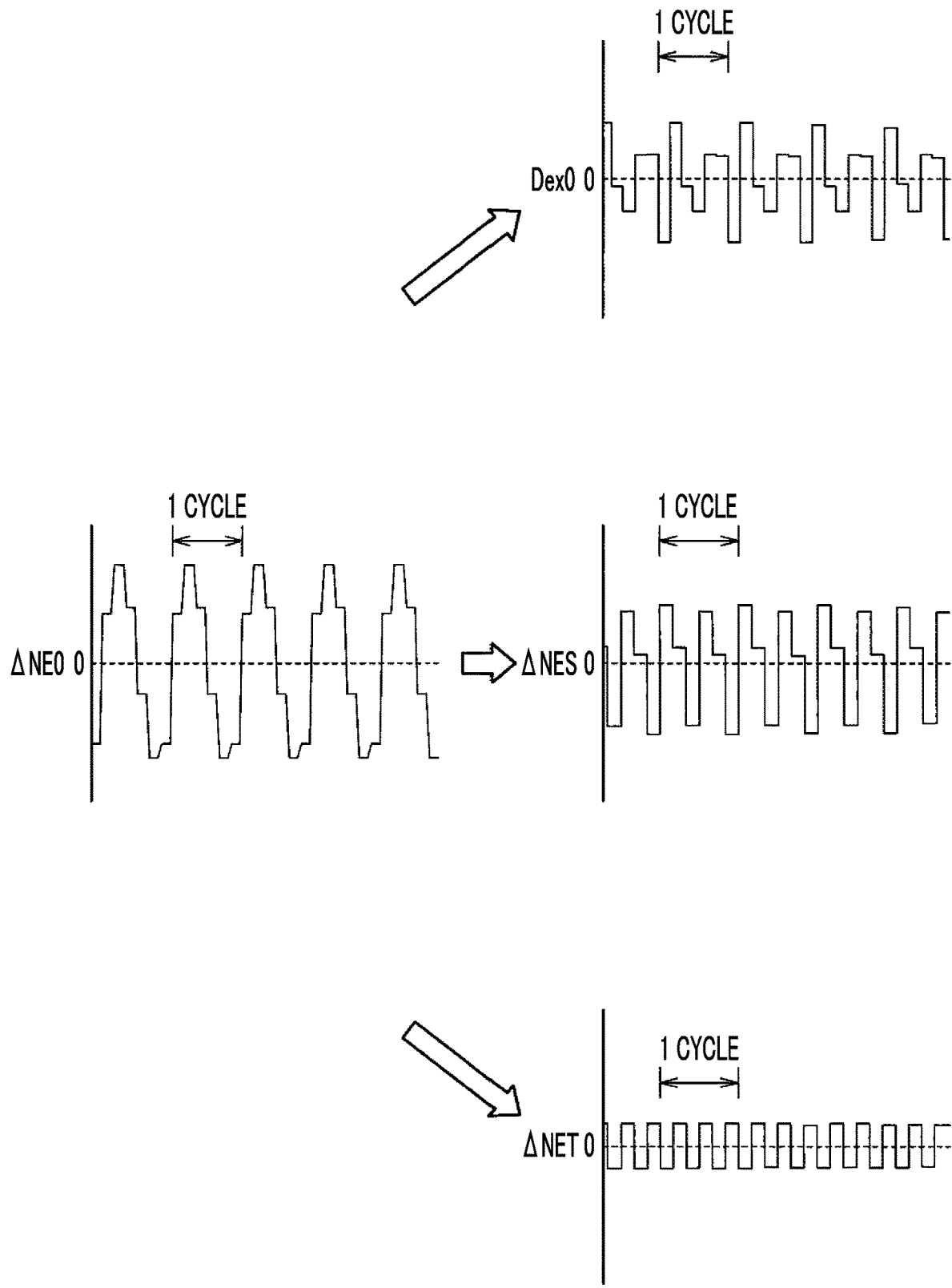
FIG. 4 is a time chart illustrating the rotation change value and a specific frequency component of the rotation change value.

FIG. 4 illustrates the time series data of the rotation change value ΔNE0 in the left side, time series data of the post-removal component Dex0 in the upper right side, time series data of the second order component ΔNES in the middle right side, and time series data of the third order component ΔNET in the lower right side. The time series data illustrated in FIG. 4 is data that is acquired when the first order cycle frequency component falls in the resonant frequency band.

Returning to FIG. 2, the NE speed calculation processing unit M30 calculates NE speeds ωNE in order based on the current instantaneous rotation time period T30. Each NE speed ωNE is the speed during a period in which the crankshaft 12 rotates by 30° CA. An NT rotation time period calculation processing unit M32 calculates instantaneous rotation time periods T24 illustrated in FIG. 1 in order based on the NT signal St. Each instantaneous rotation time period T24 is a time period needed for rotation corresponding to an interval of 24° CA. An NT speed calculation processing unit M34 calculates NT speeds ωNT in order based on the current instantaneous rotation time period T24. Each NT speed ωNT is the speed during a period in which the input shaft 36 rotates by 24°.

Figure 5:
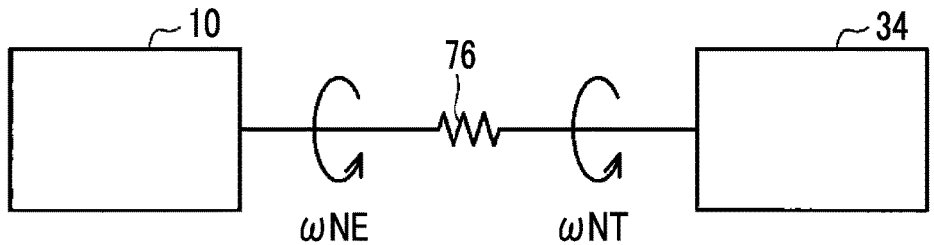
FIG. 5 is a diagram illustrating a model on which a process of a torsion component removal processing unit according to the embodiment is based.

A torsion component removal processing unit M40 calculates, based on the NE speed ωNE and the NT speed ωNT, post-removal torque Trqi by removing a component caused by torsion between the crankshaft 12 and the input shaft 36 from instantaneous torque Trq0 that is torque acquired from the rotational behavior of the crankshaft 12 per 30° CA. When a change in the rotation of the crankshaft 12 falls in the resonant frequency band and causes a noticeable influence of torsion between the crankshaft 12 and the input shaft 36, the torsion component removal processing unit M40 removes the influence. As illustrated in FIG. 5, the torsion component removal processing unit M40 executes the removal process using a model in which the internal combustion engine 10 and the transmission device 34 are connected to each other through a single damper 76.

Returning to FIG. 2, an acceleration calculation processing unit M41 takes the NE speed ωNE as an input and calculates a rotation acceleration aNE of the crankshaft 12 by calculating a derivative of the NE speed ωNE. A coefficient multiplication processing unit M42 calculates the instantaneous torque Trq0 of the crankshaft 12 by multiplying the rotation acceleration aNE by a coefficient I. The coefficient I is determined according to the moment of inertia of the drive system. A torsion speed calculation processing unit M43 calculates a torsion speed Δω by subtracting the NT speed ωNT from the NE speed ωNE. An integrating element M44 calculates a torsion angle 40 by taking the torsion speed Δω as an input. A coefficient multiplication processing unit M45 multiplies the torsion angle Δθ by the coefficient K to calculate torsion torque Trqt that is torque caused by torsion between the crankshaft 12 and the input shaft 36. The coefficient K is the elastic constant of the damper illustrated in FIG. 5. A removal processing unit M46 calculates the post-removal torque Trqi by adding the torsion torque Trqt to the instantaneous torque Trq0.

A predetermined component extraction processing unit M50 calculates a predetermined torque component Trqx by extracting a component of the resonant frequency from time series data of the post-removal torque Trqi. Specifically, the predetermined component extraction processing unit M50 performs a bandpass filtering process. For example, the bandpass filtering process may be configured with an FIR filter.

Figure 6:
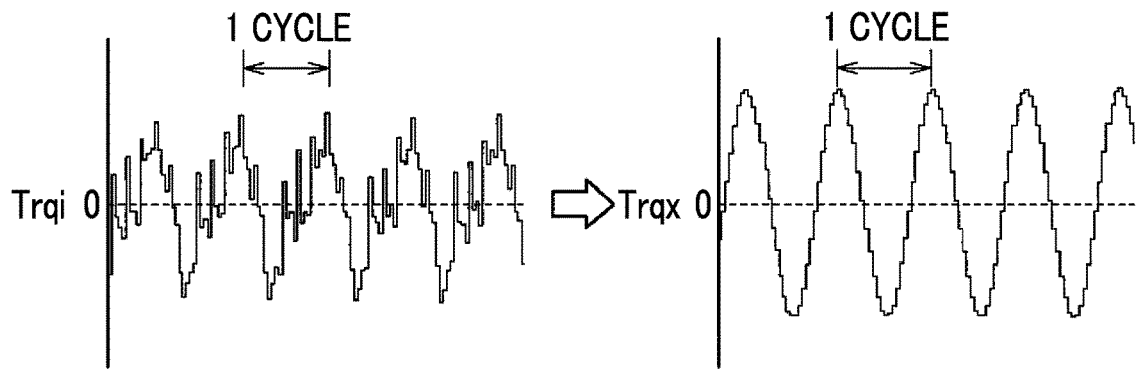
FIG. 6 is a time chart illustrating post-removal torque and a first order cycle frequency component of the post-removal torque.

FIG. 6 illustrates the time series data of the post-removal torque Trqi in the left side, and illustrates time series data of the predetermined torque component Trqx in the right side. Returning to FIG. 2, a phase adjustment processing unit M52 extracts a value that is updated per 120° CA in a predetermined phase in the time series data of the predetermined torque component Trqx which is updated per 30° CA. The phase adjustment processing unit M52 sets the value as adjusted torque Trqc. Such a process is a process of extracting information corresponding to the phase of the predetermined frequency component in the time series data of the rotation change value ΔNE0 from the predetermined torque component Trqx. The rotation change value ΔNE0 is the difference between the cylinder-specific rotation speeds ω 120 that are adjacent to each other in time series order. The difference is a value acquired by performing one type of filtering process on the cylinder-specific rotation speed ω 120. Thus, a phase lag is caused. The predetermined torque component Trqx is not a parameter indicating the difference between the cylinder-specific rotation speeds ω 120 that are adjacent to each other in time series order. Thus, there is a difference in phase between the predetermined frequency component in the time series data of the rotation change value ΔNE0 and the time series data of the predetermined torque component Trqx. Thus, the value in the predetermined phase of the predetermined torque component Trqx is selectively employed in order to decrease the difference between the phase of the predetermined frequency component in the time series data of the rotation change value ΔNE0 and the phase of the time series data of the predetermined torque component Trqx. The predetermined phase is appropriately set in accordance with a parameter and the like used in a specific process of calculating the rotation change value ΔNE0. The adjusted torque Trqc is a value acquired by keeping the value in the predetermined phase of the predetermined torque component Trqx for 120° CA.

An amplitude calculation processing unit M54 calculates, based on the amplitude of the second order component ΔNES and the amplitude of the third order component ΔNET, an amplitude that is acquired when the influence of resonance related to the predetermined frequency component in the time series data of the rotation change value ΔNE0 is excluded. Such a process uses correlation between the amplitude which is acquired when the influence of resonance related to the first order cycle component of the rotation change value ΔNE0 is excluded, and the amplitude of the second order component ONES and the amplitude of the third order component ΔNET. As described above, in the present embodiment, the process illustrated in FIG. 2 is executed when the first order cycle component falls in the resonant frequency band. Thus, the predetermined frequency component of the rotation change value ΔNE0 is the first order cycle component. The amplitude is the difference between the minimum value and the maximum value of time series data in one combustion cycle.

More specifically, the amplitude calculation processing unit M54 calculates, based on the greater value between the amplitude of the second order component ΔNES and the amplitude of the third order component ΔNET, the amplitude that is acquired when the influence of resonance related to the predetermined frequency component in the time series data of the rotation change value ΔNE0 is excluded. Specifically, the ROM 64 stores a map that defines a relationship between the amplitude of the second order component ΔNES as an input variable and the amplitude of the predetermined frequency component as an output variable, and a map that defines a relationship between the amplitude of the third order component ΔNET as an input variable and the amplitude of the predetermined frequency component as an output variable. The CPU 62 maps the amplitude that is acquired when the influence of resonance related to the predetermined frequency component in the time series data of the rotation change value ΔNE0 is excluded. The map is set data of discrete values of the input variable and the value of the output variable corresponding to each value of the input variable. For example, the mapping may be a process of calculating the corresponding value of the output variable as a calculation result when the value of the input variable matches any value of the input variable in the map, and calculating a value acquired by interpolating a plurality of values of the output variable included in the set data as a calculation result when the value of the input variable does not match any value of the input variable in the map.

A waveform shaping processing unit M56 calculates time series data having the amplitude calculated by the amplitude calculation processing unit M54 and the phase output by the phase adjustment processing unit M52, and sets the time series data as a predetermined component ΔNEF that is the predetermined frequency component in the time series data of the rotation change value ΔNE0. In the present embodiment, such a process scales time series data of the adjusted torque Trqc, which is output by the phase adjustment processing unit M52, with the amplitude calculated by the amplitude calculation processing unit M54.

Figure 7:
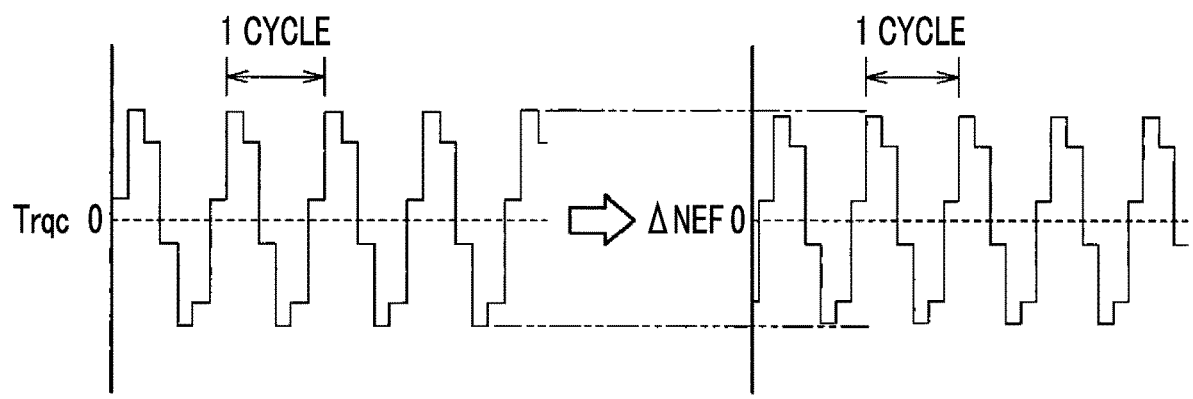
FIG. 7 is a time chart illustrating time series data of adjusted torque Trqc and a predetermined component ΔNEF.

FIG. 7 illustrates the time series data of the adjusted torque Trqc in the left side, and illustrates time series data of the predetermined component ΔNEF in the right side. The difference between the maximum value and the minimum value in the time series data of the adjusted torque Trqc in one combustion cycle is converted into the amplitude calculated by the amplitude calculation processing unit M54 in the predetermined component ΔNEF. Such a process can be realized by a process of multiplying the time series data of the adjusted torque Trqc by "A/ΔMM" using an amplitude A calculated by the amplitude calculation processing unit M54 and a value ΔMM acquired by subtracting the minimum value from the maximum value in the time series data of the adjusted torque Trqc in one combustion cycle.

Returning to FIG. 2, a restoration processing unit M58 calculates a rotation change value ΔNE by combining the post-removal component Dex0 with the predetermined component ΔNEF. The predetermined component ΔNEF is acquired by removing the influence of resonance through the process of the torsion component removal processing unit M40. Thus, the rotation change value ΔNE is acquired by removing the influence of resonance from the rotation change value ΔNE0.

Figure 8:
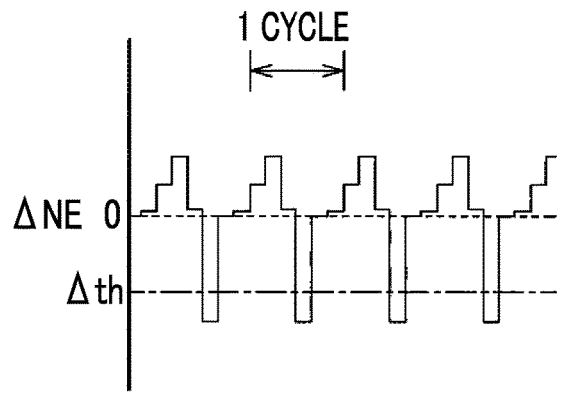
FIG. 8 is a time chart illustrating a misfire determination process according to the embodiment.

A misfire determination processing unit M60 detects the presence of misfire based on time series data of the rotation change value ΔNE. That is, as illustrated in FIG. 8, the misfire determination processing unit M60 determines whether or not repeated misfires (continuous misfire) are present in at least one of the cylinders #1 to #6, based on magnitude comparison between the rotation change value ΔNE and a threshold Δth. That is, the misfire determination processing unit M60 determines that repeated misfires are present in one cylinder when the result of magnitude comparison between the time series data of the rotation change value ΔNE and the threshold Δth is such that the rotation change value ΔNE periodically passes through the threshold Δth once in one combustion cycle as illustrated in FIG. 8. The misfire determination processing unit M60 specifies a cylinder having misfire in accordance with the phase in which the rotation change value ΔNE periodically passes through the threshold Δth.

Figure 9:
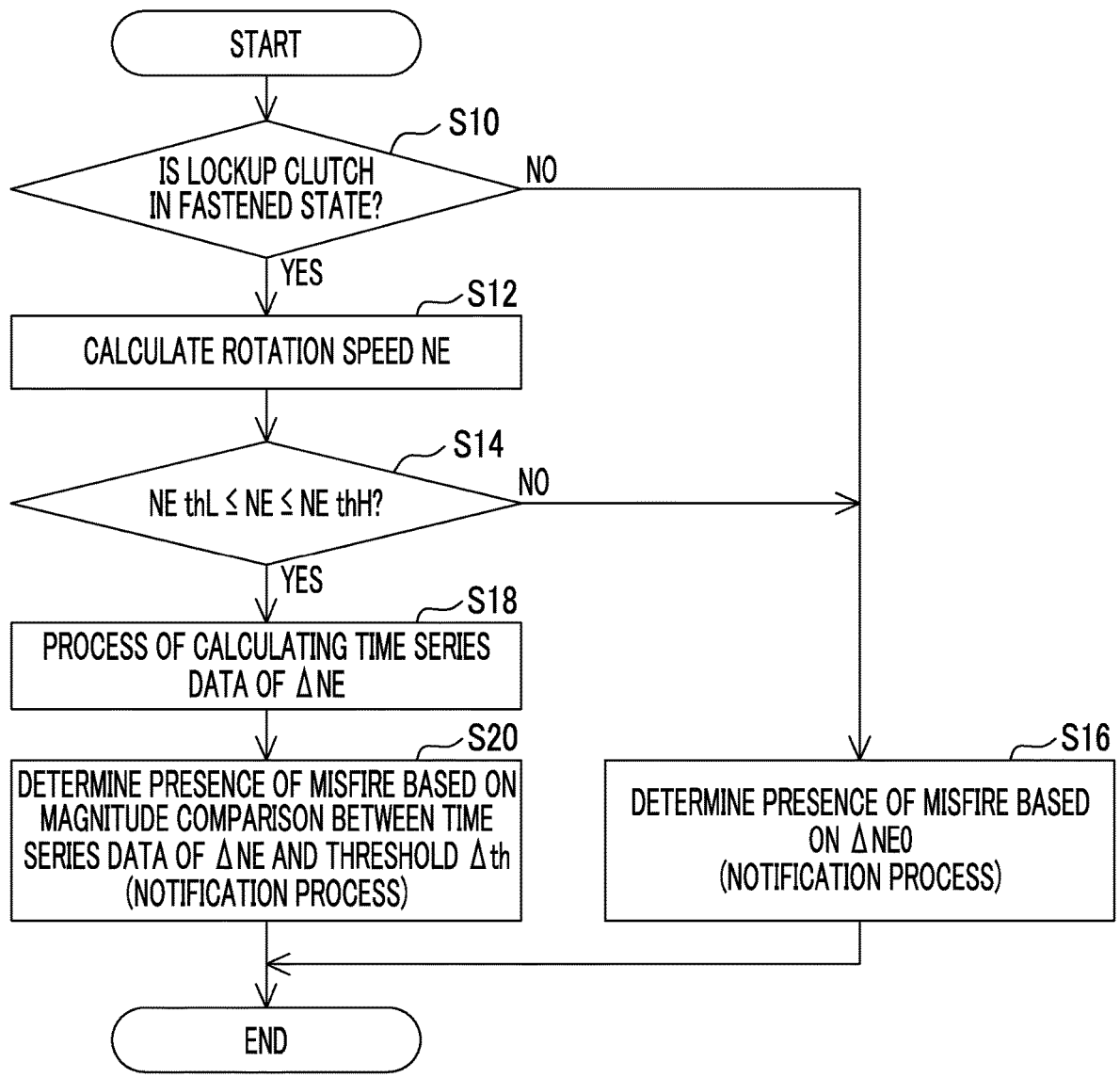
FIG. 9 is a flowchart illustrating a procedure of a misfire detection process according to the embodiment.

FIG. 9 illustrates a procedure of a process related to the detection of continuous misfire according to the present embodiment. The process illustrated in FIG. 9 is executed by the CPU 62 repeatedly executing the program stored in the ROM 64 at predetermined cycles.

In the series of processes illustrated in FIG. 9, the CPU 62 determines whether or not the lockup clutch 32 is in a fastened state (S10). When the CPU 62 determines that the lockup clutch 32 is in a fastened state (S10: YES), the CPU 62 calculates a rotation speed NE of the crankshaft 12 (S12). The rotation speed NE is the average rotation speed in an angular interval that is longer than the angular interval defining the cylinder-specific rotation speed ω 120. Specifically, for example, the CPU 62 calculates the rotation speed NE using five or more instantaneous rotation time periods T30 that are adjacent to each other in time series order.

The CPU 62 determines whether or not the logical product of a condition that the rotation speed NE is greater than or equal to a lower limit resonance value NEthL, and a condition that the rotation speed NE is smaller than or equal to an upper limit resonance value NEthH is true (S14). The lower limit resonance value NEthL indicates the lower limit value of the resonant frequency band of the drive system. The upper limit resonance value NEthH indicates the upper limit value of the resonant frequency band of the drive system. Such a process determines whether or not it is difficult to accurately detect misfire with the rotation change value ΔNE0 due to a noticeable influence of resonance exerted on the rotation change value ΔNE0 caused by the rotation speed NE falling in the resonant frequency band.

When the CPU 62 determines that the logical product is true (S14: YES), the CPU 62 calculates the time series data of the rotation change value ΔNE through the process illustrated in FIG. 2 (S18). The CPU 62 executes the process of the misfire determination processing unit M60 that determines the presence of misfire based on magnitude comparison between the time series data of the rotation change value ΔNE and the threshold Δth (S20). In the present embodiment, the threshold Δth is a negative value as illustrated in FIG. 8. When the rotation change value ΔNE is smaller than the threshold Δth, the CPU 62 determines that misfire is present. The CPU 62 sets the threshold Δth to have a smaller absolute value when the rotation speed NE is high than when the rotation speed NE is low. The reason is because a decrease in rotation speed due to misfire is more unlikely to occur when the rotation speed NE is high than when the rotation speed NE is low. The CPU 62 sets the threshold Δth to have a greater absolute value when a load KL is high than when the load KL is low. The reason is because a decrease in rotation speed due to misfire is further increased when the load KL is high than when the load KL is low. The load KL is a parameter correlated with the amount of air filling each cylinder, and is calculated based on the intake air amount Ga and the rotation speed NE.

When the CPU 62 determines that misfire is present, the CPU 62 operates a warning lamp 80 illustrated in FIG. 1 to notify a user of the presence of the malfunction and stores the content of the malfunction in the non-volatile memory 66. Storing the content of the malfunction in the non-volatile memory 66 enables the content of the malfunction to be exported to an external entity with a device that exports information from the control device 60. Thus, the process of storing the content of the malfunction is a process for notifying an external entity of the content of the malfunction.

When the CPU 62 determines that the lockup clutch is in a released state (S10: NO), or when the CPU 62 determines that the logical product is false (S14: NO), the CPU 62 transitions to the process of S16. In the process of S16, the CPU 62 calculates the rotation change value ΔNE0 by performing the same process as the processes of the instantaneous rotation time period calculation processing unit M10, the cylinder-specific speed calculation processing unit M12, and the rotation change value calculation processing unit M14 illustrated in FIG. 2. The CPU 62 determines the presence of misfire based on the rotation change value ΔNE0. Such a process is a process of comparing the magnitudes of the rotation change value ΔNE0 and the threshold Δth and determining that misfire is present when the rotation change value ΔNE0 is smaller than the threshold Δth. When the CPU 62 determines that misfire is present, the CPU 62 operates a warning lamp 80 illustrated in FIG. 1 to notify a user of the presence of the malfunction and stores the content of the malfunction in the non-volatile memory 66.

When the CPU 62 completes the process of S16 or S20, the CPU 62 temporarily finishes the series of processes illustrated in FIG. 9. The action of the present embodiment will be described.

Typically, the CPU 62 determines the presence of continuous misfire based on magnitude comparison between the rotation change value ΔNE0 and the threshold Δth. However, when the rotation speed NE falls in the resonant frequency band, the CPU 62 determines the presence of continuous misfire based on magnitude comparison between the rotation change value ΔNE and the threshold Δth. As illustrated in the left side of FIG. 4, the rotation change value ΔNE0 that falls in the resonant frequency band at the presence of continuous misfire in one cylinder is significantly different from the rotation change value ΔNE illustrated in FIG. 8. In the example illustrated in the left side of FIG. 4, more than one specific value of the six rotation change values ΔNE0 corresponding to one combustion cycle have a small value. Thus, it is difficult to accurately find the cylinder having misfire or the number of cylinders having misfire.

In the present embodiment, even when repeated misfires are present in one cylinder, a determination as to the presence of misfire and the cylinder having misfire can be made based on magnitude comparison between the rotation change value ΔNE and the threshold Δth as illustrated in FIG. 8 using the rotation change value ΔNE that is acquired through the process of the torsion component removal processing unit M40 in the resonant frequency band.

Particularly, in the present embodiment, the rotation change value ΔNE is calculated by combining the predetermined component ΔNEF with the post-removal component Dex0. The post-removal component Dex0 that is unlikely to be affected by the resonance is calculated from merely the crank signal Scr without using the NT signal St. Accordingly, the influence of the NT signal St or the influence of errors in the model of the torsion component removal processing unit M40 exerted on the rotation change value ΔNE can be significantly suppressed while the influence of resonance is excluded. Thus, the influence of errors in the NT signal St or the influence of errors in the model of the torsion component removal processing unit M40 exerted on the accuracy of misfire detection can be suppressed.

Figure 10A:
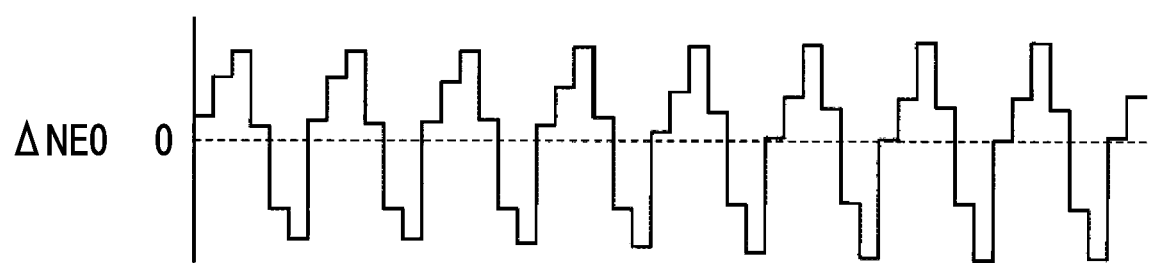
FIG. 10A is a time chart illustrating an effect of the embodiment.
Figure 10B:
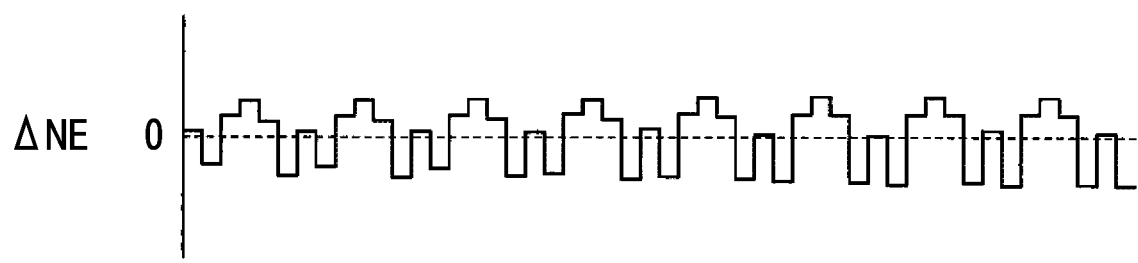
FIG. 10B is a time chart illustrating an effect of the embodiment.

The present embodiment does not merely detect repeated misfires in one cylinder when a resonance phenomenon is present. FIG. 10A and FIG. 10B are illustrations of when repeated misfires are present in the cylinder #1 and the cylinder #3. More specifically, FIG. 10A illustrates the time series data of the rotation change value ΔNE0, and FIG. 10B illustrates the time series data of the rotation change value ΔNE. As illustrated in FIG. 10B, the value of the rotation change value ΔNE has two noticeable falls in one combustion cycle. Thus, the presence of continuous misfire in the cylinder #1 and the cylinder #3 can be determined using the time series data of the rotation change value ΔNE.

According to the present embodiment described heretofore, the following effects are also achieved.

(1) The CPU 62 calculates the rotation change value ΔNE on the condition that the rotation speed NE falls in the resonant frequency band, and determines the presence of misfire based on the rotation change value ΔNE. Accordingly, the calculation load of the CPU 62 can be reduced when the rotation speed NE does not fall in the resonant frequency band.

(2) Merely the phase is used from the predetermined torque component Trqx for restoration of the predetermined frequency component of the rotation change value ΔNE0. Accordingly, the degree to which errors in the angle detected with the input shaft angle sensor 72 or errors in the model of the single damper 76 used in the torsion component removal processing unit M40 affect the rotation change value ΔNE can be reduced further than when everything including the amplitude is extracted from the predetermined torque component Trqx.

(3) The adjusted torque Trqc of which the phase is referenced in the waveform shaping processing unit M56 is calculated by adjusting the phase of the predetermined torque component Trqx. Accordingly, the phase information of the predetermined frequency component of the rotation change value ΔNE0 can be acquired without performing the same process as the process of calculating the rotation change value ΔNE0 based on the time series data of the post-removal torque Trqi. Thus, the calculation load can be reduced.

(4) The CPU 62 calculates the amplitude of the predetermined frequency component of the rotation change value ΔNE0 based on the amplitude of the second order frequency component of the combustion cycle or the amplitude of the third order frequency component of the combustion cycle. When the rotation speed NE falls in the resonant frequency band, the predetermined frequency component is the first order frequency component of the combustion cycle. Thus, the amplitude of the predetermined frequency component after removal of the influence of resonance from the rotation change value ΔNE0 can be calculated in view of a tendency that the amplitude of the first order cycle frequency component is correlated with the amplitude of the second order cycle frequency component and the amplitude of the third order cycle frequency component.

Correspondence

A correspondence between constituents in the embodiment and constituents disclosed in "SUMMARY" is as follows. Hereinafter, the correspondence will be described for each aspect disclosed in "SUMMARY".

In the first aspect, a rotating shaft corresponds to the input shaft 36. A predetermined component calculation process corresponds to the process of the torsion component removal processing unit M40 and the process of the predetermined component extraction processing unit M50. Time series data that is calculated by the predetermined component calculation process corresponds to the predetermined torque component Trqx or a predetermined speed component ωx. A predetermined component removal process corresponds to the process of the predetermined component removal processing unit M16. Time series data that is calculated by the predetermined component removal process corresponds to the time series data of the post-removal component Dex0. A restoration process corresponds to the process of the restoration processing unit M58. A misfire determination process corresponds to the process of the misfire determination processing unit M60. A misfire detection device corresponds to the control device 60. In the second aspect, a frequency determination process corresponds to the process of S14. In the third aspect, an amplitude calculation process corresponds to the process of the amplitude calculation processing unit M54. A waveform shaping process corresponds to the process of the waveform shaping processing unit M56. In the fourth aspect, a phase adjustment process corresponds to the process of the phase adjustment processing unit M52.

Other Embodiments

At least one of each constituent of the embodiment may be changed as follows.

Predetermined Component Calculation Process

Figure 11:
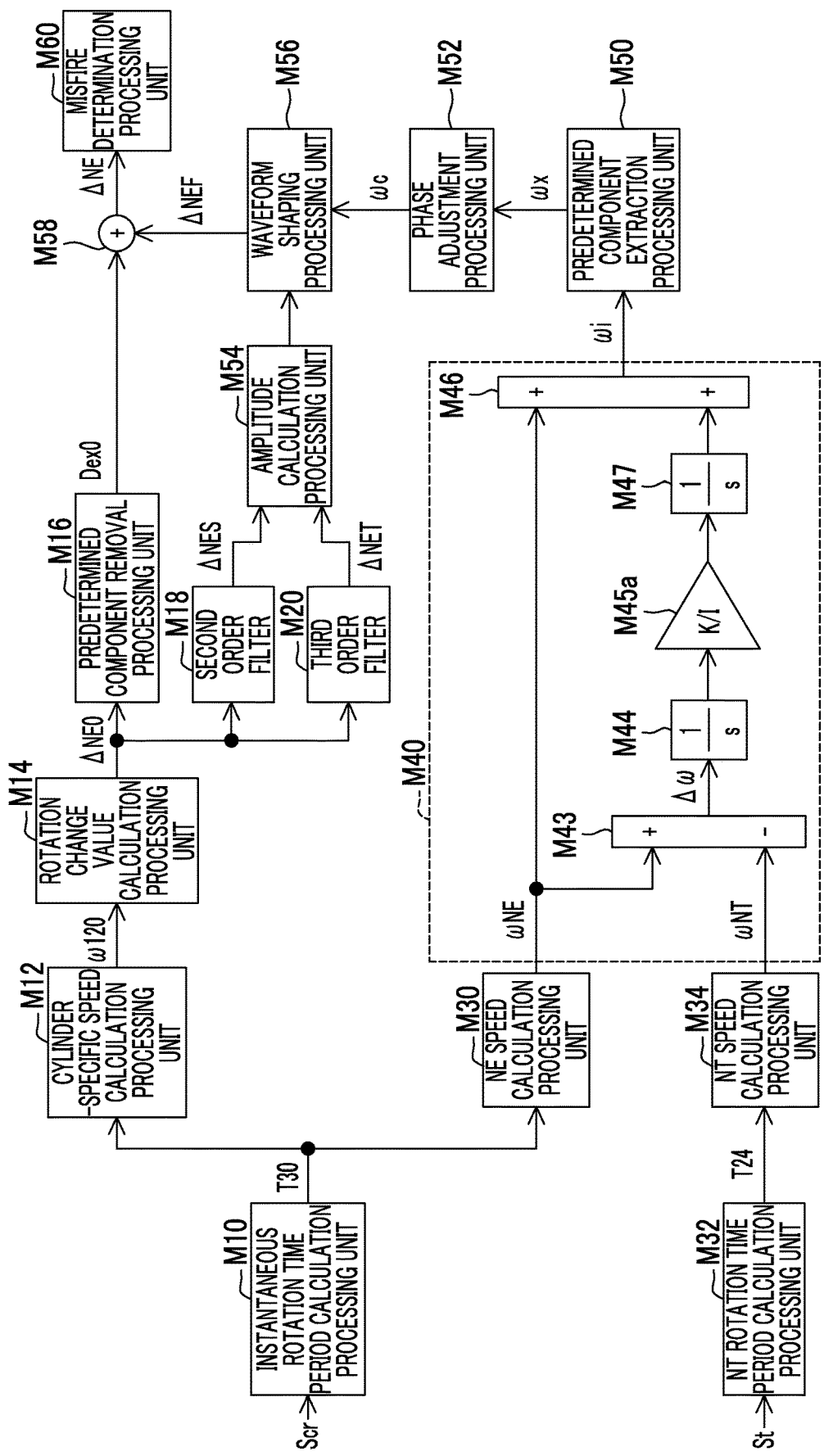
FIG. 11 is a block diagram illustrating a process related to misfire detection at the time of resonance according to a modification example of the embodiment.

The torsion component removal processing unit M40 may not calculate the post-removal torque Trqi. For example, the torsion component removal processing unit M40 may calculate a post-removal speed ωi that is acquired by removing a torsion component from the NE speed ωNE. FIG. 11 illustrates an example in which the torsion component removal processing unit M40 calculates the post-removal speed ωi. In FIG. 11, processes corresponding to the processes illustrated in FIG. 2 will be designated with the same reference signs for convenience.

As illustrated in FIG. 11, in the torsion component removal processing unit M40, a coefficient multiplication processing unit M45a multiplies the output value of the integrating element M44 by "K/I" that is acquired by dividing the coefficient K of the coefficient multiplication processing unit M45 in FIG. 2 by the coefficient I of the coefficient multiplication processing unit M42 in FIG. 2. The output value of the coefficient multiplication processing unit M45a is input into an integrating element M47. The output value of the integrating element M47 is a rotation speed component caused by torsion. Thus, the removal processing unit M46 calculates the post-removal speed ωi by adding the output value of the integrating element M47 to the NE speed ωNE. In such a case, the predetermined component extraction processing unit M50 extracts the predetermined frequency component of the post-removal speed ωi and outputs the predetermined frequency component as time series data of the predetermined speed component ωx. The phase adjustment processing unit M52 adjusts the phase of the time series data and outputs the time series data having the adjusted phase as time series data of an adjusted speed ω c. The waveform shaping processing unit M56 calculates the predetermined component ΔNEF that has the phase of the adjusted speed we and the amplitude calculated by the amplitude calculation processing unit M54.

Most of all, the dimension of the output value of the torsion component removal processing unit M40 may not be torque or speed. For example, the dimension of the output value may be time period by calculating a time period needed for rotation of 30° CA from the post-removal speed ωi illustrated in FIG. 11, and using the time period as the output value.

The predetermined component extraction processing unit M50 may not perform the bandpass filtering process for extracting the predetermined frequency component on the output value of the torsion component removal processing unit M40. For example, the bandpass filtering process for extracting the predetermined frequency component may be performed on each of the NE speed ωNE and the NT speed ωNT, and the value acquired from the filtering process may be used as an input parameter of the torsion component removal processing unit M40.

While the embodiment does not particularly mention the coefficients K, I that originate from the model of the damper 76, the coefficients may be updated by learning as disclosed in JP 2008-248877 A. Accordingly, errors in the model can be decreased, and the post-removal torque Trqi and the like can have accurate values.

Frequency Determination Process

When there is a plurality of frequency bands in which a noticeable resonance phenomenon occurs in a possible rotation frequency region of the rotation speed NE at the time of normal operation of the internal combustion engine 10 as disclosed in "Predetermined Frequency Component", a process of determining whether or not the rotation speed NE falls in any of the frequency bands, and a process of determining which frequency band the rotation speed NE falls in are executed. In such a case, the target that is removed by the predetermined component removal processing unit M16 in FIG. 2, the frequency component that is input into the amplitude calculation processing unit M54, and the target that is extracted by the predetermined component extraction processing unit M50 are changed according to the specified frequency band. In such a case, a filter that can calculate the amplitude illustrated in "Amplitude Calculation Process" is used instead of the second order filter M18 and the third order filter M20.

When there is one frequency band in which a noticeable resonance phenomenon occurs in a possible rotation frequency region of the rotation speed NE at the time of normal operation of the internal combustion engine 10 unlike the embodiment, the determination processes may not be executed. When the determination processes are removed from the embodiment, the second order filter M18 extracts the second order cycle frequency component, and the third order filter M20 extracts the third order cycle frequency component. The predetermined component removal processing unit M16 removes the first order cycle frequency component, and the predetermined component extraction processing unit M50 extracts the first order cycle frequency component. Accordingly, when the rotation speed NE falls in the resonant frequency band, the same process as the embodiment is performed, and the equivalent effect is achieved. When the rotation speed NE does not fall in the resonant frequency band, the rotation change value ΔNE has a value equivalent to the rotation change value ΔNE0. Thus, the presence of continuous misfire can be determined based on the rotation change value ΔNE0.

Predetermined Component Removal Process

The bandpass filtering process that removes the predetermined component may not be executed with the rotation change value ΔNE0 as an input. For example, the bandpass filtering process that removes the predetermined component may be performed on the cylinder-specific rotation speed ω 120. Then, the difference between a pair of cylinder-specific rotation speeds ω 120, of the cylinder-specific rotation speeds ω 120 after the filtering process, that are adjacent to each other in time series order may be calculated, and the difference may be used as the output value of the predetermined component removal processing unit M16. Alternatively, for example, the bandpass filtering process that removes the predetermined component may be performed on each instantaneous rotation time period T30. Then, time series data of the cylinder-specific rotation speed ω 120 may be calculated from each instantaneous rotation time period T30 after the filtering process, and the difference between the cylinder-specific rotation speeds ω 120 adjacent to each other in time series order may be used as the output value of the predetermined component removal processing unit M16 based on the time series data.

Predetermined Frequency Component

While the embodiment illustrates the first order cycle frequency component as falling in the resonant frequency band, the present disclosure is not limited thereto. For example, the second order cycle frequency component or a half order cycle frequency component may fall in the resonant frequency band. There may be more than one frequency band in which a noticeable resonance phenomenon occurs in the possible rotation frequency region of the rotation speed NE at the time of normal operation of the internal combustion engine 10.

Technique of Calculating Phase of Predetermined Frequency Component

While, in the embodiment, the phase adjustment processing unit M52 selects the predetermined phase from the output value of the predetermined component extraction processing unit M50, the present disclosure is not limited thereto. For example, the cylinder-specific rotation speed ω 120 may be calculated based on the post-removal speed ωi illustrated in FIG. 11, and the difference between the cylinder-specific rotation speeds ω120 adjacent to each other in time series order may be calculated based on the cylinder-specific rotation speed ω120. Then, the phase acquired after the bandpass filtering process that transmits the predetermined component is performed on the difference in cylinder-specific rotation speed ω may be used.

Amplitude Calculation Process

For example, in the process of FIG. 2, the third order filter M20 may be removed, and the amplitude of the predetermined frequency component may be calculated based on the amplitude of the second order component ΔNES.

The present disclosure is not limited to calculating the amplitude of the first order cycle frequency component using either the amplitude of the second order cycle frequency component or the amplitude of the third order cycle frequency component. For example, as disclosed in "Predetermined Frequency Component", when the second order cycle frequency falls in the resonant frequency band, the amplitude of the second order cycle frequency component may be calculated using either the amplitude of the first order cycle frequency component or the amplitude of the third order cycle frequency component. Alternatively, for example, as disclosed in "Internal Combustion Engine", when an eight-cylinder internal combustion engine is used, the amplitude of the first order cycle frequency component may be calculated using either the amplitude of the second order cycle frequency component or the amplitude of the fourth order cycle frequency component.

Restoration Process

The present disclosure is not limited to performing the process of combining the predetermined component ΔNEF output by the waveform shaping processing unit M56 with the post-removal component Dex0. For example, the time series data of the cylinder-specific rotation speed ω 120 may be calculated based on the post-removal speed ωi illustrated in FIG. 11, and the difference between the cylinder-specific rotation speeds ω 120 adjacent to each other in time series order in the time series data may be calculated. The bandpass filtering process that transmits the predetermined frequency component may be performed on the difference in cylinder-specific rotation speed ω 120, and the output of the bandpass filtering process may be used instead of the predetermined component ΔNEF. Even in such a case, components other than the predetermined frequency are calculated without using the NT signal St. Thus, the influence of detection errors caused by the NT signal St can be suppressed in the restored time series data of the rotation change value.

Misfire Determination Process

The threshold Δth may not be changed according to the rotation speed NE and the load KL. For example, the threshold Δth may be changed according to merely the rotation speed NE, changed according to merely the load KL, or set as a fixed value.

Time Series Data Indicating Rotational Behavior

The cylinder-specific rotation speed that is used in calculation of the rotation change value ΔNE is not limited to the rotation speed in a range of 30 ATDC to 150 ATDC. For example, as disclosed in "Internal Combustion Engine", when the number of cylinders of the internal combustion engine is four, the cylinder-specific rotation speed may be the rotation speed in a range of 180° CA. Most of all, such a configuration does not mean that the rotation speed in a range of "720° CA/N" should be used as the cylinder-specific rotation speed in an internal combustion engine having N cylinders. For example, in the six-cylinder internal combustion engine, the cylinder-specific rotation speed may be the rotation speed in a range of 60 ATDC to 150 ATDC. Alternatively, for example, the phase in the range of determining the cylinder-specific rotation speed may be changed according to the ignition timing.

While, in the embodiment, the rotation change value ΔNE is set as the difference in cylinder-specific rotation speed that is the rotation speed in the rotation angle interval showing the influence of combustion in each of the cylinders which are adjacent to each other in time series order of compression top dead center, the present disclosure is not limited thereto. For example, the rotation change value ΔNE may be set as the difference in time period needed for rotation corresponding to the rotation angle interval that shows the influence of combustion in each of the cylinders adjacent to each other in time series order of compression top dead center. Specifically, as illustrated in the lower side of FIG. 3, for example, the rotation change value ΔNE may be set as the difference between the cylinder-specific rotation time periods T120 adjacent to each other in time series order. Alternatively, for example, the rotation change value ΔNE may be set as the difference in cylinder-specific torque that is the torque of the crankshaft 12 in the rotation angle interval showing the influence of combustion in each of the cylinders successive in time series order of compression top dead center. For example, the cylinder-specific torque may be the average value of the value of the instantaneous torque Trq0 in the period of 30 ATDC to 150 ATDC in the corresponding cylinder.

The technique of quantifying the difference in rotational behavior in the rotation angle interval that shows the influence of combustion in each of the cylinders successive in time series order of compression top dead center according to the rotational behavior of the crankshaft shown on the crank signal is not limited to the technique that uses the difference in cylinder-specific rotation speed, the difference in cylinder-specific rotation time period, or the difference in cylinder-specific torque. For example, a quantity that corresponds to the cylinder-specific rotation speed of each cylinder may be calculated as a value acquired by subtracting the instantaneous speed in a range of 30 ATDC to 60 ATDC from the instantaneous speed in a range of 90 ATDC to 120 ATDC, and the difference in the corresponding quantity related to the adjacent cylinders in time series order of compression top dead center may be calculated.

The rotation change value ΔNE is not limited to the difference in cylinder-specific rotation speed or quantity or the like corresponding to the cylinder-specific rotation speed between the cylinders that are adjacent to each other in time series order of compression top dead center. For example, the rotation change value ΔNE may be the difference in cylinder-specific rotation speed ω 120 between the cylinders with another cylinder interposed therebetween in time series order of compression top dead center. That is, for example, the rotation change value ΔNE may be a value or the like acquired by subtracting the cylinder-specific rotation speed ω 120 of the first cylinder #1 from the cylinder-specific rotation speed ω 120 of the third cylinder #3.

Process for Notifying External Entity of Misfire Detection Result

While the embodiment illustrates the process of operating the warning lamp 80 and the process of storing the content of the malfunction in the non-volatile memory 66 as the process for notifying an external entity of the misfire detection result, the present disclosure is not limited thereto. For example, merely the process of storing the content of the malfunction in the non-volatile memory 66 may be executed, or, for example, merely the process of operating the warning lamp 80 may be executed. Alternatively, a process of outputting an audio signal indicating the presence of the malfunction from a speaker may be performed, or a process of outputting a radio signal related to the content or the like of the malfunction to an external entity may be performed. That is, an electronic device in the process of operating an electronic device in order to notify an external entity of the presence of the malfunction is not limited to the warning lamp 80 or the non-volatile memory 66, and may be a speaker, a radio transmitter, and the like.

Internal Combustion Engine

The internal combustion engine 10 is not limited to the six-cylinder internal combustion engine. For example, the internal combustion engine 10 may have four cylinders or eight cylinders. When the internal combustion engine 10 has eight cylinders, a filter that extracts a fourth order component is desirably used instead of the third order filter M20.

The internal combustion engine is not limited to an internal combustion engine in which torque is adjusted with the amount of air filling each cylinder and, for example, may be an internal combustion engine in which torque is adjusted according to the amount of injection, like a diesel engine. In such a case, the load KL may be replaced with the amount of injection or the accelerator operation amount.

Misfire Detection Device

The misfire detection device is not limited to a misfire detection device that includes the CPU 62 and the ROM 64 and executes a software process. For example, the misfire detection device may include a dedicated hardware circuit (for example, an ASIC) that performs a hardware process for at least a part of the software process in the embodiment. That is, the misfire detection device may have any of the following configurations (a) to (c).

(a) The misfire detection device includes a processing device that executes the entirety of the process in accordance with a program, and a program storage device such as a ROM that stores the program.

(b) The misfire detection device includes a processing device executing a part of the process in accordance with a program, a program storage device, and a dedicated hardware circuit executing the remaining process.

(c) The misfire detection device includes a dedicated hardware circuit that executes the entirety of the process.

The misfire detection device may include a plurality of software processing circuits including the processing device and the program storage device, or a plurality of dedicated hardware circuits. That is, the process may be executed by a processing circuit that includes one or a plurality of software processing circuits, or one or a plurality of dedicated hardware circuits, or both thereof.

When the misfire detection device includes a dedicated hardware circuit, at least one of the process of the predetermined component removal processing unit M16, the process of the second order filter M18, the process of the third order filter M20, and the process of the predetermined component extraction processing unit M50 may be executed with an analog filter.

Others

The crankshaft 12 may not be configured to be connected to the drive wheel 50 through the torque converter 30 and the transmission device 34. For example, a planetary gear mechanism to which a motor generator and a drive wheel are mechanically connected may be mechanically connected to the crankshaft 12.

The interval between the tooth portions 22 of the crank rotor 20 is not limited to 10° CA. The instantaneous rotation time period is not limited to a time period needed for rotation of 30° CA. The NE speed is not limited to the rotation speed in an interval of 30° CA.

The interval between the tooth portions 42 of the NT rotor 40 is not limited to 12°. The NT speed is not limited to a time period needed for rotation of 24°. While the embodiment is based on a design in which each of the second order filter M18, the third order filter M20, and the like has the same phase lag, the present disclosure is not limited thereto. When there is a difference in phase lag between each filter, a process of adjusting the difference in phase may be added.

What is claimed is:

1. A misfire detection device for an internal combustion engine including a plurality of cylinders and a crankshaft configured to be connected to a rotating shaft of a transmission device, the misfire detection device comprising:
    a rotation angle sensor configured to output a detected angle signal of the rotating shaft by detecting a rotation angle of the rotating shaft of the transmission device;
    a crank angle sensor configured to output a crank signal by detecting a crank angle of the crankshaft of the internal combustion engine; and
    an electronic control unit configured to
        calculate first time series data based on the detected angle signal of the rotating shaft and the crank signal of the crankshaft in a connected state that is a state where the rotating shaft and the crankshaft are connected to each other, the first time series data being time series data of a predetermined frequency component in time series data acquired by removing a component caused by torsion between the crankshaft and the rotating shaft from a rotational behavior of the crankshaft shown on the crank signal,
        generate, in the connected state, second time series data that is acquired by removing the predetermined frequency component from time series data indicating the rotational behavior of the crankshaft,
        generate third time series data that indicates the rotational behavior of the crankshaft and is acquired by combining the second time series data with the predetermined frequency component based on the first time series data and the second time series data, and
        determine presence of misfire in the internal combustion engine based on the third time series data.

2. The misfire detection device according to claim 1, wherein:
    the predetermined frequency component is a component in a resonant frequency band of a drive system that includes the internal combustion engine and the transmission device;
    the electronic control unit is configured to determine whether or not an integer multiple frequency of one combustion cycle falls in the resonant frequency band based on a rotation speed of the crankshaft; and the electronic control unit is configured to generate the third time series data when the integer multiple frequency of one combustion cycle falls in the resonant frequency band.

3. The misfire detection device according to claim 1, wherein:
the electronic control unit is configured to calculate, in the connected state, an amplitude of the predetermined frequency component of the time series data indicating the rotational behavior of the crankshaft based on an amplitude of a frequency component other than the predetermined frequency component in the time series data indicating the rotational behavior of the crankshaft;
the electronic control unit is configured to generate fourth time series data based on the amplitude of the predetermined frequency component and a phase of the predetermined frequency component corresponding to the first time series data; and
the electronic control unit is configured to generate the third time series data by combining the fourth time series data with the second time series data.

4. The misfire detection device according to claim 3, wherein:
the third time series data is time series data of a difference in rotation speed in a rotation angle interval that shows an influence of combustion in each of a pair of cylinders successive in time series order of compression top dead center, or time series data of a difference in rotation time period in the rotation angle interval;
the electronic control unit is configured to calculate, as the first time series data, the predetermined frequency component in time series data that is acquired by removing the component caused by torsion from the rotation speed or torque of the crankshaft;
the electronic control unit is configured to adjust a phase of the first time series data; and
the electronic control unit is configured to generate the predetermined frequency component of the second time series data based on the phase of the predetermined frequency component of the first time series data of which the phase is adjusted.

5. The misfire detection device according to claim 3, wherein:
the predetermined frequency component is one of three frequency components of a first order frequency component, a second order frequency component, and a third order frequency component of a combustion cycle; and
the electronic control unit is configured to calculate the amplitude of the predetermined frequency component based on amplitudes of a remaining frequency components of the three frequency components.

* * * * *